United States Patent
Raffio et al.

(10) Patent No.: US 10,015,065 B1
(45) Date of Patent: Jul. 3, 2018

(54) ADAPTIVE PATH TRACE

(71) Applicant: Amazon Technologies, Inc., Seattle, WA (US)

(72) Inventors: Alessandro Raffio, Dublin (IE); Neil Michael Cowzer, Dublin (IE); Maurizio Cimadamore, Donabate (IE)

(73) Assignee: Amazon Technolgies, Inc., Seattle, WA (US)

( * ) Notice: Subject to any disclaimer, the term of this patent is extended or adjusted under 35 U.S.C. 154(b) by 227 days.

(21) Appl. No.: 14/500,851

(22) Filed: Sep. 29, 2014

(51) Int. Cl.
*H04L 12/26* (2006.01)
*H04L 12/727* (2013.01)

(52) U.S. Cl.
CPC ............ *H04L 43/062* (2013.01); *H04L 43/12* (2013.01); *H04L 45/121* (2013.01)

(58) Field of Classification Search
None
See application file for complete search history.

(56) References Cited

U.S. PATENT DOCUMENTS

| | | | | |
|---|---|---|---|---|
| 5,886,643 A | * | 3/1999 | Diebboll | H04L 45/02 370/245 |
| 8,811,193 B2 | * | 8/2014 | Jeyachandran | H04L 41/12 370/248 |
| 2005/0286434 A1 | * | 12/2005 | McKee | H04L 43/022 370/252 |
| 2007/0177518 A1 | * | 8/2007 | Li | H04L 43/50 370/252 |
| 2009/0135727 A1 | * | 5/2009 | Agrawal | H04L 12/2602 370/248 |
| 2011/0286348 A1 | * | 11/2011 | Yamasaki | H04L 43/00 370/252 |
| 2012/0233308 A1 | * | 9/2012 | Van De Houten | H04L 43/12 709/224 |

* cited by examiner

*Primary Examiner* — Cheikh Ndiaye
(74) *Attorney, Agent, or Firm* — Baker & Hostetler LLP

(57) ABSTRACT

Based on network route tracing data from a set of monitored computing nodes, pairs of network analysis agents that are allocated to monitored computing nodes that are linked by at least a target number of non-redundant network paths are identified. The identified pairs of agents are de-allocated from the set of monitored computing nodes. New pairs of agents are allocated to the set of monitored computing nodes to replace the de-allocated pairs of agents.

20 Claims, 5 Drawing Sheets

ADAPTIVE PATH TRACE

BACKGROUND

Network diagnostic tools are useful for identifying issues and problems in a computer network such as a slow network connection. For example, the "traceroute" utility and similar diagnostic tools are useful for identifying the hops/paths, or transfers through nodes on a network, that a message traverses from a source network address to a destination network address. The traceroute utility may provide a user with the routers traversed from the source network address to the destination network address, as well as the elapsed time for each hop. This information can be useful for identifying a failed connection or for identifying the cause of a slow connection or other issues related to packet losses, delays, and latencies. For example, the information can be used to detect losses in the network and triangulate the losses to specific links that have been detected.

DETAILED DISCLOSURE

In general, this disclosure describes a system and method for implementing a network path tracing mechanism that continuously monitors the state of a network and is responsive to real-time changes to the network. Some network path tracing mechanisms operate by sending periodic probes between pairs of agents. A network path tracing mechanism may select agent pairs that send each other probe reports in order to achieve maximal coverage of the underlying network graph. In large network environments, such as a data center operated by a provider network, there may be hundreds or thousands of network devices and thus the agent pairs must cover scores of network paths. In many cases, processes that determine placement of agent pairs are not run continuously, and thus the network path tracing mechanism cannot promptly react to changes in the underlying network. Also, since coverage predictions are made using non-real-time data, coverage may be less than expected and the number of agent pairs may not be optimal, resulting in a low coverage/number of pairs ratio (this ratio may be referred to as "path efficiency").

In some embodiments, a system and method is described for an adaptive network path tracing mechanism that continuously operates and ranks agent pairs using a score, where the score indicates the effectiveness with which a given pair contributes to the overall network coverage (e.g., a low score indicates poor coverage provided by that agent pair). The adaptive network path tracing mechanism then removes the worst performing path and replaces the pair with new pairs. The new pairs may be selected randomly. This analysis and replacement process may be executed on a continuous basis or on a periodic basis. In this way, changes in the network topology can be identified without significant delay. Furthermore, since coverage is measured in terms of real traceroutes, the feedback loop allows the allocator to converge on an ideal set of agent pairs, which can be significantly smaller than the set of pairs produced by existing network path tracing mechanisms.

Figure 1:
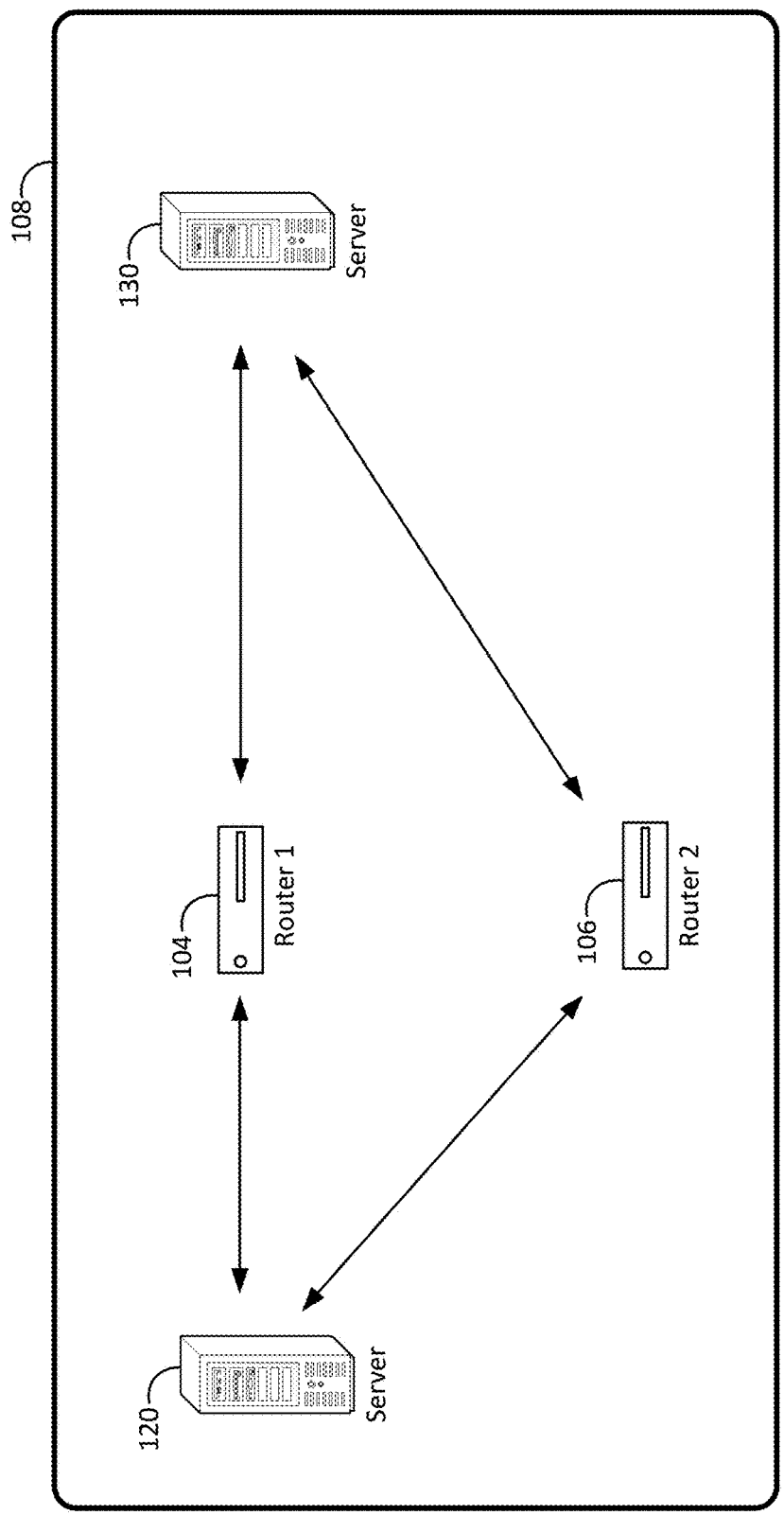
FIG. 1 is a diagram illustrating an adaptive traceroute mechanism in accordance with the present disclosure.

FIG. 1 illustrates one example embodiment of route tracing mechanism. FIG. 1 illustrates servers 120 and 130 in a data center 108 that are configured to provide computing resources to users (not shown) operating computing devices (not shown). The provider network may desire to collect information regarding data paths between servers 120 and 130. Data packets from server 120 may take a path via router 1 (104). However, data packets from server 120 may also take a path via router 2 (106). In an embodiment, network analysis agents may be installed on servers 120 and 130. The network analysis agents may send multiple traceroute messages and response messages to one another so that traceroute information can be obtained not only for the path via router 1 (104), but also the path via router 2 (106).

Figure 2:
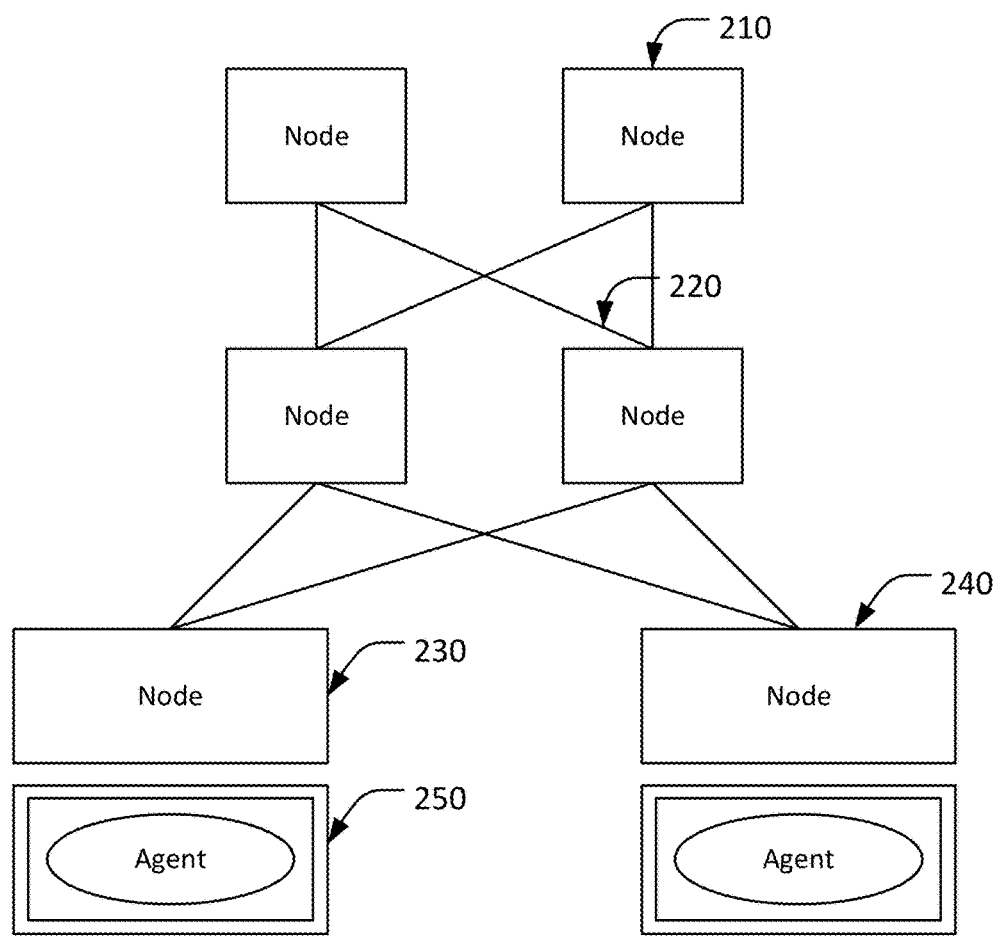
FIG. 2 is a diagram illustrating an adaptive traceroute mechanism in accordance with the present disclosure.

In general, the traceroute utility is one example of a network diagnostic function that can be used to identify the network path that a data packet takes from a source computer to a destination computer. The traceroute utility typically lists the intermediate routers that the data packet passes through until either the packet reaches its destination or fails to reach its destination and is discarded. In addition, the traceroute utility typically collects information for the elapsed time taken for each hop from router to router. A user may thus be able to identify how the source and destination systems are connected to each other and the latencies involved for each hop. For example, referring to FIG. 2, a user may wish to determine network paths from computing node 230 to another computing node 240. A traceroute utility may be used to determine which of the network paths 220 and other nodes 210 are traversed from computing node 230 to computing node 240. Network analysis agents 250 may be installed on computing nodes 230 and 240 which are configured to send multiple traceroute messages and response messages to one another so that traceroute information can be determined.

Generally, a network tracing mechanism can generate traceroutes using agent pairs that are installed on selected pairs of computing devices in the network. The agent pairs can send packets to one another to identify various paths between the agent pairs. Typically, an administrator must make the decision as to which pairs of computing devices in the network should host the pairs of agent pairs. One drawback is that the agent pairs are typically selected statically based on a current snapshot of the topology of the network, and thus the agent pairs are installed on a periodic basis. Real-time changes to a network cannot be accounted for until the next manual update.

In some embodiments, devices where agent pairs are to be installed are selected randomly. The quality of paths returned by the agent pairs may be scored using a scoring function. Based on analysis of the results, placement of agent pairs can be optimized so that the total number of required pairs is minimized. The results from the network paths can be used to identify bad paths for replacement or other remedial actions.

In one embodiment, analysis for selection of agent pairs is performed on a continuous basis based on feedback and evaluation of the network traces returned by the agent pairs. Allocations may be sorted based on the scores, and a set of allocations can be dropped that falls under a given score threshold. A new set of random allocations can be added.

In one embodiment, allocations can be deleted with a given randomness factor in order to minimize the chance of bulk-deleting all paths covering a given link, which would make the algorithm unstable. Deletion of allocations may also be referred to as de-allocation. Furthermore, in some embodiments, additions and removals of new paths can be performed continuously so that the provider network can promptly react to network changes. At the same time, the rate of changes should be relatively low so as not to disrupt coverage.

A learning function can be implemented so that over time, distances between agent pairs can be learned so that when allocating new random paths, precedence is given to agent pairs that are closer to each other. This function can be configured to counterbalance tendencies to select two agents that are far apart when picking a random agent pair. Furthermore, the learning function can be used to identify agent pairs that cross and avoid a bottleneck. Precedence can be configured to an optimal ratio of the bottleneck crossing and avoidance agents may be assigned to ensure improved coverage in terms of path diversity.

Between two ranking cycles, a delay can be implemented in order to allow for the propagation of new traceroutes. The delay can be implemented to allow a new set of pairs of agents to obtain information about their traceroutes, therefore allowing for the computation of a new ranking. Furthermore, during startup, the number of additions of allocations can be greater than deletions in order to allow all links to be more quickly discovered.

In one embodiment, traceroutes that are returned by the agents can be evaluated by matching IP addresses and identifying specific devices passed through based on topological information. The traceroutes can then be scored based on uniqueness of links traversed. The paths can be sorted by scores, and the lowest scoring paths are removed. In some embodiments, lower scores are those with more redundant paths. Those agent pairs with the lowest aggregated scores can be removed.

In one embodiment, a target number of paths that cover each link in the network can be determined by the provider network. The target number can be determined to achieve a desired number of diverse paths for a given link.

In some embodiments, optimizations may further be achieved by allocating new paths until a median number of the total links is covered. Allocations may be initiated with randomly selected agents that have some capacity. A corresponding agent can be selected with a function that takes into the account the distance between these agents.

A ranking algorithm for optimizing the number of links may be implemented. The algorithm may provide an increase in a ranking score as the number of links decreases. In one embodiment, an allocation can have an infinite value if you have one path between links, lower values as the number of paths increases, and a zero value when the target number is reached. An "allocation" or "path allocation" may refer to the assignment of work between two agents in a set. The selection of links may be configured so as to obtain a zero value for as many path allocations as possible.

In order to make random allocation more effective and to allow faster convergence on shorter paths, each of source/destination network area pairs can be tracked along with their distance measured in terms of numbers of links. A network area may include agents that are clustered based on attributes such as their common links, distance, etc., from another cluster of agents. As new paths are allocated and scored, the relative distances between pairs of network areas can be tracked. This information can be used to adjust the random allocation algorithm so that, given a random source agent, a target agent may be selected that is more likely to be close to the given source. In one embodiment, this can be achieved as follows:

1. Determine the network area associated with the source agent.

2. The network area will contain a list of all destination areas, ranked by distance. Determine the cumulative distribution function (cdf) associated with a non-uniform probability distribution (negative slope). The goal is to associate a higher probability to areas that are closer to a given source.

3. Use the cumulative distribution function to map a uniformly chosen random number to a target network area, according to the desired probability distribution.

4. Select a random agent among those available in the target network area.

Generally, the total number of paths in a network can be expressed as follows:

links=number of links in the network target=number of required paths per link avgHops=average number of links per path paths=links*target/avgHops In one embodiment, the following formulas may be used to implement at least some of the methods and systems described herein:

$T$=target paths per links(configurable parameter)

$N$=noise pct ratio(i.e., percentage of paths that will change when the system converges)

paths($x$)=number of paths covering link $x$ $score$=SUM(1){($T^2-(T$*paths(1)))/paths(1)} numAllocations=$T$*$L$/avg(hops)

budget=$N$*numAllocations deletionRatio=paths_$p$50/2$T$ deltaLinks=seenLinks($t$)−seen_links($t$−1)

deltaPaths=numAdditions($t$−1)

linkPerPath=deltaLinks/deltaPaths numAdditions=budget*(1−deletionRatio)*(1+linkPerPath)

numDeletions=budget*deletionRatio traceroutesRate=1000/TraceRouteRateLimit· maxTraceRouteDurationMillis* TraceRouteRateLimit·maxConcurrentTraceRoutes refreshRate=(numAllocations+numAdditions−numDeletions)/traceroutesRate If convergence does not occur, then iterations may be stopped so that adjustments can be made. In some embodiments, a plurality of functions or formulas may be implemented that may be selected based on factors such as network distance or density.

Figure 3:
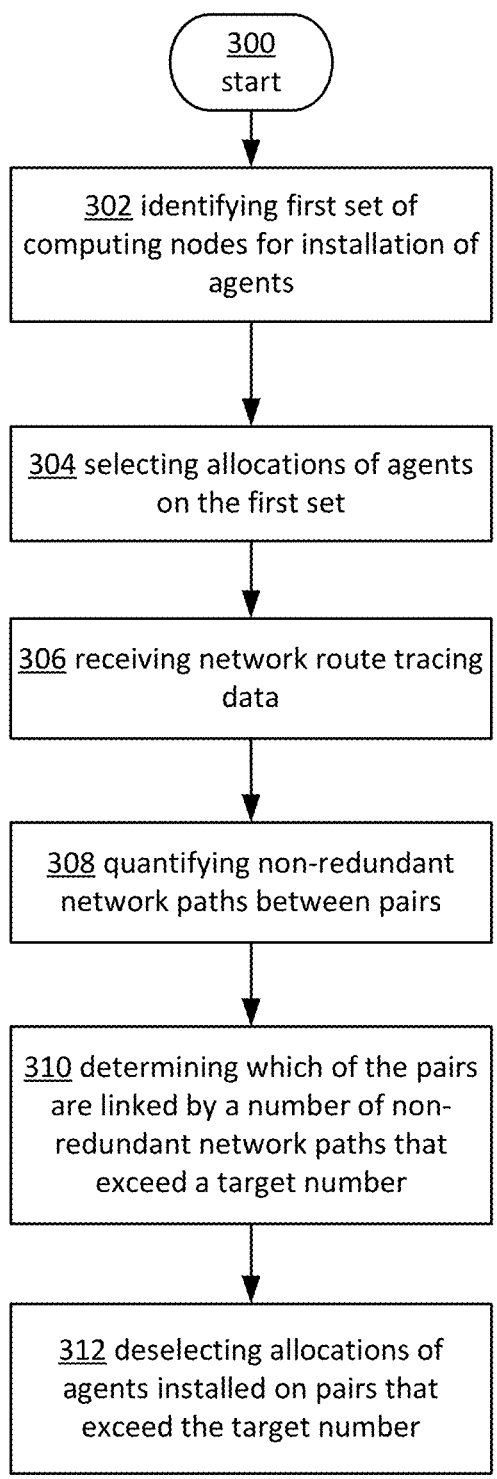
FIG. 3 is a flowchart of one embodiment of a process for identifying network information.

FIG. 3 illustrates an example operational procedure for managing network resources. The operational procedure may be implemented in a system comprising one or more computing devices. Referring to FIG. 3, operation 300 begins the operational procedure. Operation 300 may be followed by operation 302. Operation 302 illustrates identifying a first set of computing nodes of a provider network for installation of network analysis agents.

Operation 302 may be followed by operation 304. Operation 304 illustrates selecting allocations of the network analysis agents on the first set of computing nodes. Operation 304 may be followed by operation 306. Operation 306 illustrates receiving network route tracing data from the network analysis agents that are indicative of network paths between pairs of computing nodes in the first set of computing nodes. Operation 306 may be followed by operation 308. Operation 308 illustrates based on the network route tracing data, quantifying non-redundant network paths between the pairs of computing nodes in the first set of computing nodes.

Operation 308 may be followed by operation 310. Operation 310 illustrates determining which of the pairs of computing nodes in the first set of computing nodes are linked by a number of non-redundant network paths that exceed a target number of non-redundant network paths. Operation 310 may be followed by operation 312. Operation 312 illustrates causing removal of network analysis agents installed on those pairs of computing nodes in the first set of computing nodes that are determined to have non-redundant network paths that exceed the target number. The described operations may be performed iteratively or at a defined interval or time period.

Figure 4:
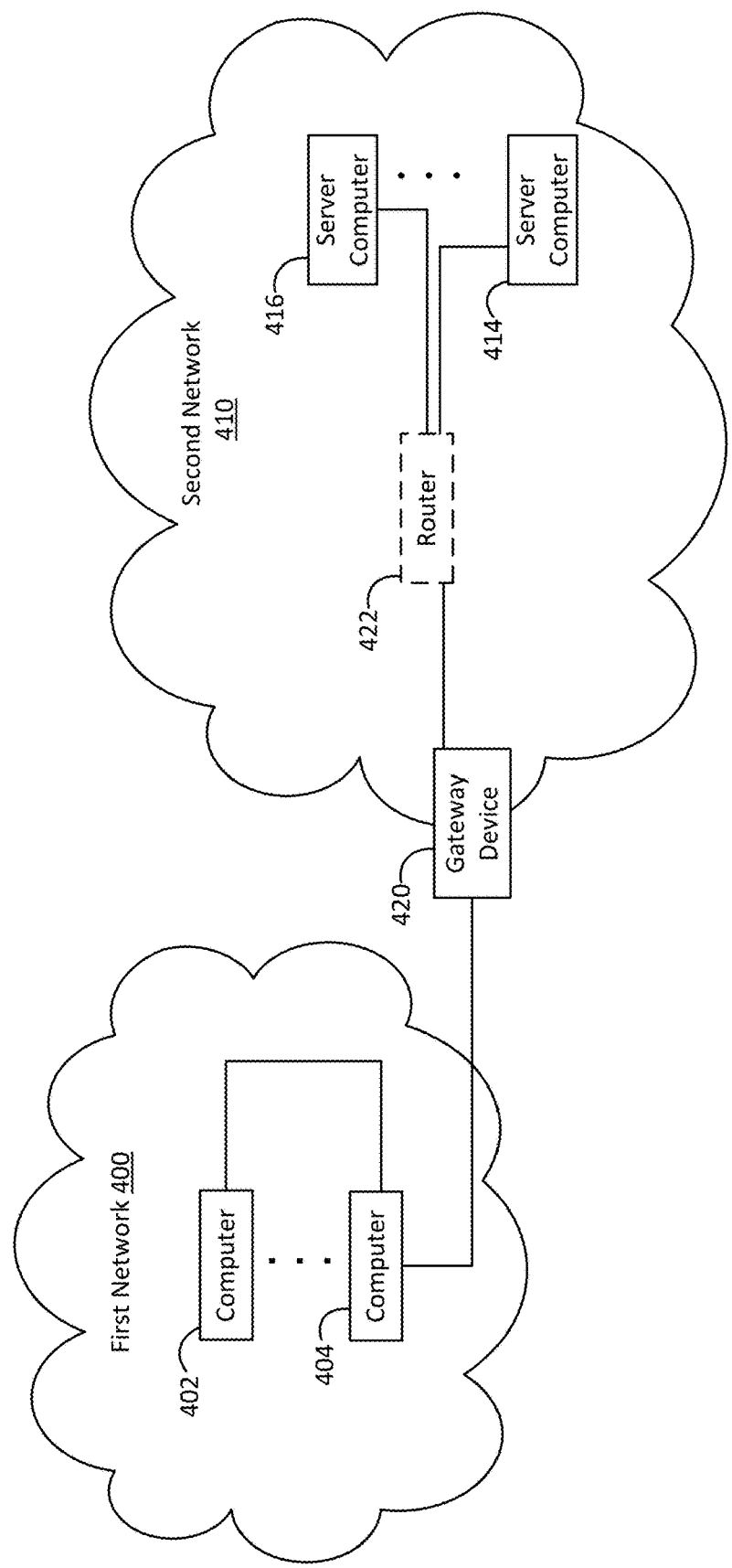
FIG. 4 is a block diagram illustrating an example computer system that may be used in some embodiments.

FIG. 4 illustrates one example of an environment including a group of computing systems in which aspects of the present disclosure may be implemented. As shown in FIG. 4, the example includes a second network 410 that includes server computers 416 and 414. In particular, second network 410 may be connected to a first network 400 external to second network 410. First network 400 may provide access to computers 402 and 404.

First network 400 may be, for example, a publicly accessible network made up of multiple networks operated by various entities such as the Internet. Second network 410 may be, for example, a company network that is wholly or partially inaccessible from computing systems external to second network 410. Computers 402 and 404 may include, for example, home computing systems that connect directly to the Internet (e.g., via a cable modem or a Digital Subscriber Line (DSL)).

In addition to server computers 416 and 414 of second network 410, second network 410 may include a gateway 420. Second network 410 may further include additional networking devices, such as a router 422. Router 422 may manage communications within second network 410, for example by forwarding packets or other data communications as appropriate based on characteristics of such communications (e.g., header information including source and/or destination addresses, protocol identifiers, etc.) and/or the characteristics of the second network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

Referring to FIG. 4, server computers 416 and 414 are part of second network 410, and each server computer may be assigned a network address (not shown) in accordance with second network 410. For example, the second network addresses may be unique with respect to the second network but not guaranteed to be unique with respect to other computing systems that are not part of second network 410.

As one example, Internet Protocol (IP) and other networking protocols may reserve groups or blocks of network addresses, with such reserved network addresses not being routable over networks external to the second network 410. In such situations, different networks may each use the same network addresses within their networks, as the network addresses are locally unique to each network, but those network addresses may not be used for communications between a computing system of a different network and another computing system external to the network. IP addresses are used to illustrate some example embodiments in the present disclosure. However, it should be understood that other network addressing schemes may be applicable and are not excluded from the scope of the present disclosure.

In this example, to facilitate communications between server computers 416 and 414 of second network 410 and other external computing systems that are not part of second network 410 (e.g., computers 402 and 404 and/or other computing systems that are part of first network 400), one or more gateway devices 420 may be used. In particular, one or more first network 400 addresses (not shown) may have previously been assigned for use in representing second network 410. Such first network addresses may be routable over the Internet such that a communication that is sent by external computer 402 and that has one of second network 410's first network addresses as its destination network address will be routed over the Internet to gateway device 420. Furthermore, additional gateway devices (not shown) may be provided as needed.

Gateway device 420 may operate to manage both incoming communications to the second network 410 from first network 400 and outgoing communications from second network 410 to first network 400. For example, if server computer 416 sends a message (not shown) to computer 402 in first network 400, server computer 416 may create an outgoing communication that includes an external first network address (e.g., a public IP address) for computer 402 as the destination address and include a second network address (e.g., a private IP address) for server computer 416 as the source network address. Router 422 then uses the destination address of the outgoing message to direct the message to gateway device 420 for handling. In particular, in order to allow computer 402 to reply to the outgoing message, gateway device 420 may temporarily map one of the public network addresses for second network 410 to server computer 416 and modify the outgoing message to replace the source network address with the mapped first network address. Gateway device 420 may then update its mapping information with the new mapping, and forward the modified outgoing message to the destination computer 402 over the Internet.

If computer 402 responds to the modified outgoing message by sending a response incoming message (not shown) that uses the mapped first network address for server computer 416 as the destination network address, the response incoming message may be directed over the Internet to gateway device 420. Gateway device 420 may then perform similar processing in reverse to that described above for the outgoing message. In particular, gateway device 420 may use its mapping information to translate the mapped first network address into the second network address of server computer 416, modify the destination network address of the response incoming message from the mapped first network address to the second network address of server computer 416, and forward the modified incoming message to server computer 416. In this manner, at least some of the internal computers of second network 410 may communicate with external computing systems via temporary use of the first network addresses. Furthermore, in some situations, one or more of the internal computing systems of second network 410 may be mapped to use one of the first network addresses (e.g., to a unique combination of a first network address and a port number), such that external computing systems may initiate new incoming messages to the internal computing system by directing the new incoming messages to the mapped representative first network address/port as the destination network address of the new incoming messages.

Figure 5:
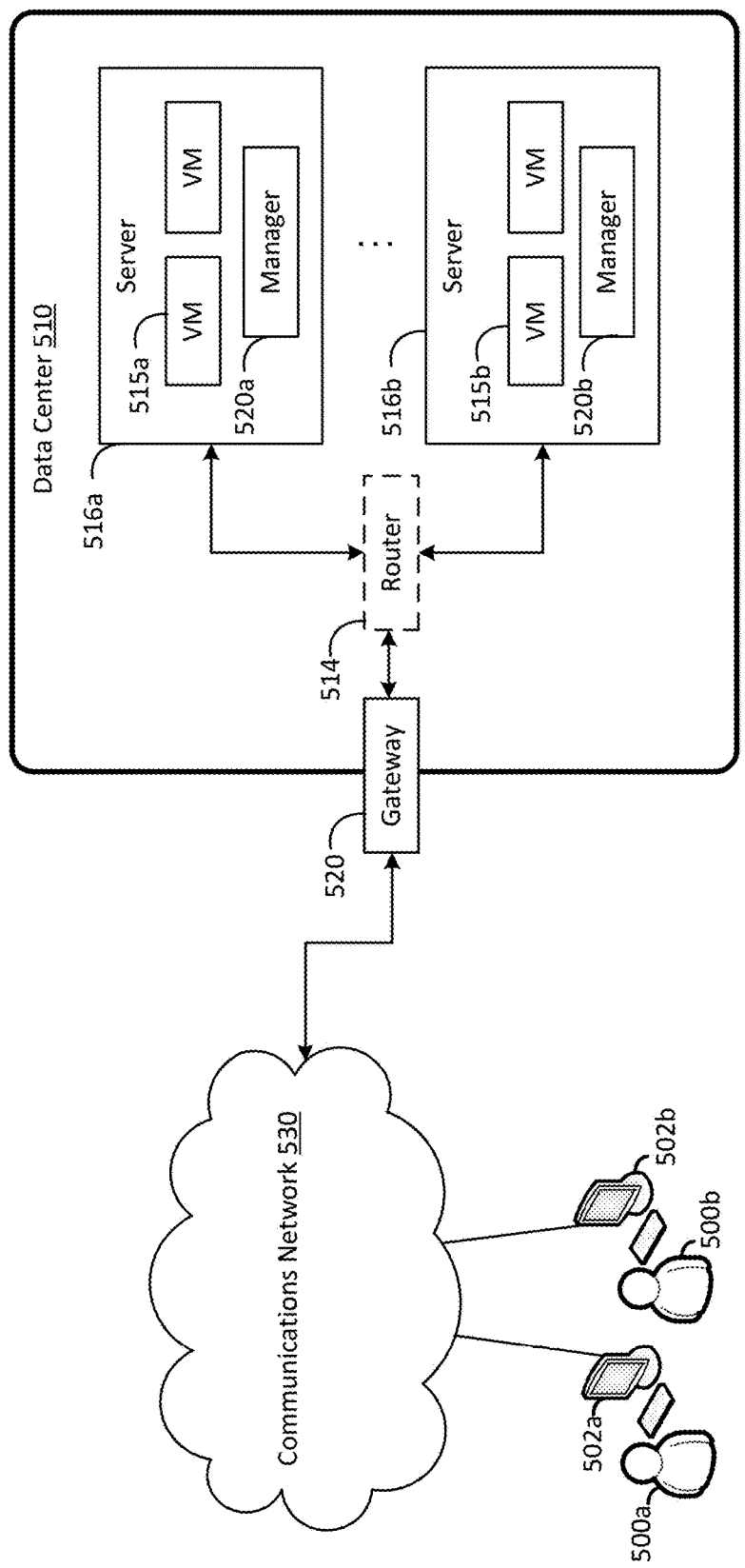
FIG. 5 is a block diagram illustrating an example computer system that may be used in some embodiments.

FIG. 5 depicts an example computing environment wherein aspects of the present disclosure can be implemented. Referring to FIG. 5, communications network 530 may, for example, be a publicly accessible network of linked networks and possibly operated by various distinct parties, such as the Internet. In other embodiments, communications network 530 may be a private network, such as, for example, a corporate or university network that is wholly or partially inaccessible to non-privileged users. In still other embodiments, communications network 530 may include one or more private networks with access to and/or from the Internet.

Communications network 530 may provide access to computers 502. User computers 502 may be computers utilized by customers 500a or 500b or other customers of data center 500. For instance, user computer 502a or 502b may be a server, a desktop or laptop personal computer, a tablet computer, a wireless telephone, a personal digital assistant (PDA), an e-book reader, a game console, a set-top box, or any other computing device capable of accessing data center 510. User computer 502a or 502b may connect directly to the Internet (e.g., via a cable modem or a Digital Subscriber Line (DSL)). Although only two user computers 502a and 502b are depicted, it should be appreciated that there may be multiple user computers.

User computers 502 may also be utilized to configure aspects of the computing resources provided by data center 510. In this regard, data center 510 might provide a web interface through which aspects of its operation may be configured through the use of a web browser application program executing on user computers 502. Alternatively, a stand-alone application program executing on user computers 502 might access an application programming interface (API) exposed by data center 510 for performing the configuration operations. Other mechanisms for configuring the operation of the data center 510, including deploying updates to an application, might also be utilized.

Servers 516a and 516b shown in FIG. 5 may be standard servers configured appropriately for providing the computing resources described above and may provide computing resources for executing one or more applications. In one embodiment, the computing resources may be virtual machine instances 515a and 515b. In the example of virtual machine instances 515, each of the servers 516 may be configured to execute an instance manager 520a or 520b capable of executing the virtual machine instances 515. The instance managers 520 may be a virtual machine monitor (VMM) or another type of program configured to enable the execution of virtual machine instances 515 on servers 516, for example. As discussed above, each of the virtual machine instances 515 may be configured to execute all or a portion of an application.

It should be appreciated that this example describes a computing environment providing virtual machine instances, other types of implementations can be utilized with the concepts and technologies disclosed herein. For example, the embodiments disclosed herein might also be utilized with computing systems that do not utilize virtual machine instances.

In the example data center 510 shown in FIG. 5, a router 514 may be utilized to interconnect the servers 516a and 516b. Router 514 may also be connected to gateway 522, which is connected to communications network 530. Router 514 may manage communications within networks in data center 500, for example by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In some embodiments, one or more of the virtual machine instances 515 of data center 510 may form part of one or more networks. In some embodiments, gateway 522 may be used to provide network address translation (NAT) functionality to a group of virtual machine instances and allow the virtual machine instances of the group to use a first group of internal network addresses to communicate over a shared internal network and to use a second group of one or more other external network addresses for communications between virtual machine instances of the group and other computing systems or virtual machine instances that are external to the group. An IP address is one example of a network address that is particularly applicable to the TCP/IP context in which some embodiments of the present disclosure can be implemented. The use of IP addresses herein is intended to be illustrative of network addresses and not limiting as to the scope of the described concepts.

Virtual machine instances 515 may be assigned a private network address (not shown). For example, the private network addresses may be unique with respect to their respective private networks but not guaranteed to be unique with respect to other computing systems that are not part of the private network. IP addresses are used to illustrate some example embodiments in the present disclosure. However, it should be understood that other network addressing schemes may be applicable and are not excluded from the scope of the present disclosure.

Gateway 522 may operate to manage both incoming communications to data center 510 from communications network 530 and outgoing communications from data center 510 to communications network 530. For example, if virtual machine instance 515a sends a message (not shown) to computer 502a, virtual machine instance 515a may create an outgoing communication that includes network address on a first network (e.g., an external public IP address) for computer 502a as the destination address and include a network address on a second network (e.g., a private IP address) for virtual machine instance 515a as the source network address. Router 514 may then use the destination address of the outgoing message to direct the message to gateway 522 for handling. In particular, in order to allow computer 502a to reply to the outgoing message, gateway 522 may temporarily map one of the public network addresses for data center 510 to virtual machine instance 515a and modify the outgoing message to replace the private network address for the source network address with the mapped public network address. Gateway 522 may then update its mapping information with the new mapping, and forward the modified outgoing message to computer 502a over the Internet.

If computer 502a responds to the modified outgoing message by sending a response incoming message (not shown) that uses the mapped public network address for virtual machine instance 515a as the destination network address, the response incoming message may be directed over the Internet to gateway 522. Gateway 522 may then perform similar processing in reverse to that described above for the outgoing message. In particular, gateway 522 may use its mapping information to translate the mapped public network address into the private network address of virtual machine instance 515a, modify the destination network address of the response incoming message from the mapped public network address to the private network address of virtual machine instance 515a, and forward the modified incoming message to virtual machine instance 515a. In this manner, at least some of the internal computers of data center 510 may communicate with external computing systems via temporary use of the public network addresses. Furthermore, in some situations, one or more of the internal computing systems of data center 510 may be mapped to use one of the public network addresses (e.g., to a unique combination of a public network address and a port number), such that external computing systems may initiate new incoming messages to the internal computing system by directing the new incoming messages to the mapped representative public network address/port as the destination network address of the new incoming messages.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 510 described in FIG. 5 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

It will be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations. For example, the methods and systems described herein for providing reverse traceroute proxy mechanisms may be performed by devices other than computing systems and gateway devices. For example, the described processes may be performed in part or in whole by other network devices and peripherals such as a network interface card (NIC) or any other device configured to perform such functionality.

In some embodiments, a system memory may be used which is one embodiment of a computer readable storage medium configured to store program instructions and data as described above for FIGS. 1-5 for implementing embodiments of the corresponding methods and apparatus. However, in other embodiments, program instructions and/or data may be received, sent or stored upon different types of computer-accessible media. Generally speaking, a computer readable storage medium may include non-transitory and tangible storage media or memory media, such as magnetic or optical media, e.g., disk or DVD/CD coupled to a computer system or gateway device. A computer readable storage medium may also include any volatile or non-volatile media, such as RAM (e.g. SDRAM, DDR SDRAM, RDRAM, SRAM, etc.), ROM, etc., that may be included in some embodiments of the computer systems described above as system memory, gateway device, or another type of memory. Portions or all of the multiple computer systems such as those illustrated herein may be used to implement the described functionality in various embodiments; for example, software components running on a variety of different devices and servers may collaborate to provide the functionality.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different ways in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of the inventions disclosed herein.

What is claimed is:

1. A computing system comprising at least one computing device and at least one data store in communication with the at least one computing device, the at least one data store having stored therein computer-readable instructions that, upon execution by the at least one computing device, cause at least:
   identifying a first set of computing nodes of a provider network for installation of network analysis agents;
   selecting allocations of the network analysis agents for the installation on the first set of computing nodes;
   receiving network route tracing data from the allocated network analysis agents comprising information usable to identify network paths between pairs of computing nodes in the first set of computing nodes;
   based on the network route tracing data, quantifying non-redundant network paths between the pairs of computing nodes in the first set of computing nodes;
   determining which of the pairs of computing nodes in the first set of computing nodes are linked by a number of non-redundant network paths that exceed a target number of non-redundant network paths;
   de-allocating the network analysis agents installed on those pairs of computing nodes in the first set of computing nodes that are determined to be linked by the number of non-redundant network paths that exceed the target number; and
   replacing the de-allocated network analysis agents with additional network analysis agents on randomly selected computing nodes.

2. The computing system according to claim 1, wherein said quantifying comprises determining a score for ranking the pairs of computing nodes.

3. The computing system according to claim 2, wherein the score indicates a degree to which a given pair of computing nodes contributes to network coverage.

4. The computing system according to claim 3, wherein the score is directly proportional to an amount of coverage provided by the given pair of computing nodes.

5. A non-transitory computer-readable storage medium having stored thereon computer-readable instructions, the computer-readable instructions comprising instructions that upon execution on a computing node, at least cause:
   identifying a set of computing nodes of a provider network that are to be monitored for network link coverage;
   allocating network analysis agents for installation on the monitored set of computing nodes of the provider network;
   based on network route tracing data from the network analysis agents on the monitored set of computing nodes, ranking pairs of the monitored computing nodes to indicate a relative ordering of the monitored pairs of the computing nodes based on numbers of non-redundant network paths between the monitored pairs of the computing nodes;
   based on the ranking, removing pairs of the set of monitored computing nodes that are linked by a number of non-redundant network paths that exceed a target number of non-redundant network paths; and adding new pairs of the monitored computing nodes to the set of monitored computing nodes to replace the removed pairs of the monitored computing nodes.

6. A computer-implemented method for identifying network information, comprising:

allocating network analysis agents for installation on a set of monitored computing nodes of a provider network;

based on network route tracing data from the network analysis agents installed on the set of monitored computing nodes, identifying which pairs of the network analysis agents that are allocated to the set of monitored computing nodes are linked by a number of non-redundant network paths that exceed a target number of non-redundant network paths;

de-allocating the identified pairs of network analysis agents from the set of monitored computing nodes; and allocating further pairs of network analysis agents to the set of monitored computing nodes to replace the de-allocated pairs of network analysis agents.

7. The method of claim 6, further comprising selecting the set of monitored computing nodes of the provider network for monitoring network path coverage between the set of monitored computing nodes.

8. The method of claim 7, further comprising installing network analysis agents on the set of monitored computing nodes.

9. The method of claim 6, wherein said identifying comprises quantifying non-redundant network paths between the identified pairs of network analysis agents in the set of monitored computing nodes.

10. The method of claim 6, further comprising determining scores for the pairs of network analysis agents.

11. The method of claim 10, wherein a given one of the scores indicates a degree to which a given pair of network analysis agents contributes to network coverage.

12. The method of claim 10, wherein scores increase as coverage provided by a given pair of network analysis agents increases.

13. The method of claim 10, wherein the scores are determined as a function of target paths per link and a number of paths covering a given link.

14. The method of claim 6, wherein the allocated further pairs are selected randomly.

15. The method of claim 6, wherein the allocated further pairs are selected according to a distribution function.

16. The method of claim 6, further comprising allocating additional pairs until a median number of links are covered by a sufficient number of redundant paths.

17. The method of claim 15, wherein the allocated further pairs are allocated based on a link distance between the computing nodes of the pair.

18. The non-transitory computer-readable storage medium of claim 5, wherein the ranking includes assigning scores to the pairs of monitored computing nodes.

19. The non-transitory computer-readable storage medium of claim 18, wherein the scores are determined as a function of the target number and the number of non-redundant paths covering a given pair.

20. The non-transitory computer-readable storage medium of claim 5, wherein the pairs of the computing nodes are selected randomly.

* * * * *